(12) United States Patent
Wainner et al.

(10) Patent No.: US 8,861,929 B2
(45) Date of Patent: Oct. 14, 2014

(54) PER-SUBSCRIBER ADAPTIVE BIT RATE STREAM MANAGEMENT METHOD

(75) Inventors: Warren Scott Wainner, Sterling, VA (US); Mahesh Vittal, Sunnyvale, CA (US); Stinson Mathai, Flower Mound, TX (US)

(73) Assignee: Cisco Technology, Inc., San Jose, CA (US)

( * ) Notice: Subject to any disclaimer, the term of this patent is extended or adjusted under 35 U.S.C. 154(b) by 341 days.

(21) Appl. No.: 13/087,010

(22) Filed: Apr. 14, 2011

(65) Prior Publication Data

US 2012/0263434 A1  Oct. 18, 2012

(51) Int. Cl.
| | |
|---|---|
| H04N 9/80 | (2006.01) |
| H04N 21/2343 | (2011.01) |
| H04N 21/658 | (2011.01) |
| H04N 21/2385 | (2011.01) |
| H04N 21/6332 | (2011.01) |
| H04N 21/61 | (2011.01) |
| H04N 21/24 | (2011.01) |
| H04N 5/765 | (2006.01) |
| H04N 21/262 | (2011.01) |
| H04N 21/81 | (2011.01) |
| H04N 21/845 | (2011.01) |
| H04N 21/854 | (2011.01) |
| H04N 21/2662 | (2011.01) |
| H04N 9/82 | (2006.01) |

(52) U.S. Cl.
CPC ......... *H04N 5/765* (2013.01); *H04N 21/23439* (2013.01); *H04N 21/6581* (2013.01); *H04N 9/8205* (2013.01); *H04N 21/2385* (2013.01); *H04N 21/6332* (2013.01); *H04N 21/6131* (2013.01); *H04N 21/2402* (2013.01); *H04N 21/26258* (2013.01); *H04N 21/812* (2013.01); *H04N 21/8456* (2013.01); *H04N 21/85406* (2013.01); *H04N 21/2662* (2013.01)
USPC ...................................... 386/241; 386/E5.003

(58) Field of Classification Search
USPC .......................................... 386/241, E05.003
See application file for complete search history.

(56) References Cited

U.S. PATENT DOCUMENTS

| 8,099,473 | B2 * | 1/2012 | Biderman et al. ............ 709/217 |
| 2003/0014367 | A1 * | 1/2003 | Tubinis ........................... 705/64 |
| 2010/0077099 | A1 * | 3/2010 | Gordon ........................ 709/233 |
| 2011/0246616 | A1 * | 10/2011 | Ronca et al. .................. 709/219 |
| 2011/0252082 | A1 * | 10/2011 | Cobb et al. .................... 709/203 |
| 2011/0320287 | A1 * | 12/2011 | Holt et al. .................. 705/14.73 |

* cited by examiner

*Primary Examiner* — Thai Tran
*Assistant Examiner* — Girumsew Wendmagegn
(74) *Attorney, Agent, or Firm* — Merchant & Gould

(57) ABSTRACT

Consistent with embodiments of the present invention, a system may be provided to provide per-subscriber stream management comprising: a client capable of receiving a playlist containing a subset of segments associated with a video asset; a video application server to request subscriber state information and to build state representations in a subscriber database on a per-subscriber basis; a media segmenter capable of providing the video asset in multiple bit rates; a subscriber state manager capable of managing the current state of one or more subscribers in a subscriber database; and a stream manager capable of requesting the assignment of bandwidth from a wireless infrastructure on a per-subscriber basis.

19 Claims, 10 Drawing Sheets

PER-SUBSCRIBER ADAPTIVE BIT RATE STREAM MANAGEMENT METHOD

TECHNICAL-FIELD

The present disclosure relates generally to leveraging the generic distributed content distribution model using HTTP delivery while retaining control of the subscriber streaming session.

BACKGROUND

Video streaming has evolved from linear synchronous delivery methods (e.g., RTSP and RTP) to non-linear file delivery methods (e.g., RTMP and HTTP). This transition has disrupted the traditional business models for such applications as ad-insertion, access control, and quality of service monitoring. New delivery methods, such as progressive-download and adaptive bit rate usage have created an environment where the state of the client is decoupled from the content origin by means of content distribution servers. The client may asynchronously request the content from the distribution servers which may mitigate the centralized control of ad-insertion and quality of service. In addition, the access control elements may be entrusted to the clients such that they may obtain, decrypt, and decode the content on the distributed servers.

BRIEF DESCRIPTION OF THE DRAWINGS

Many aspects of the disclosure can be better understood with reference to the following drawings. The components in the drawings are not necessarily to scale. Emphasis is instead placed upon clearly illustrating the principles of the present disclosure. Moreover, in the drawings, like references numerals designate corresponding parts through the several figures.

DETAILED DESCRIPTION OF EXAMPLE EMBODIMENTS

Figure 1:
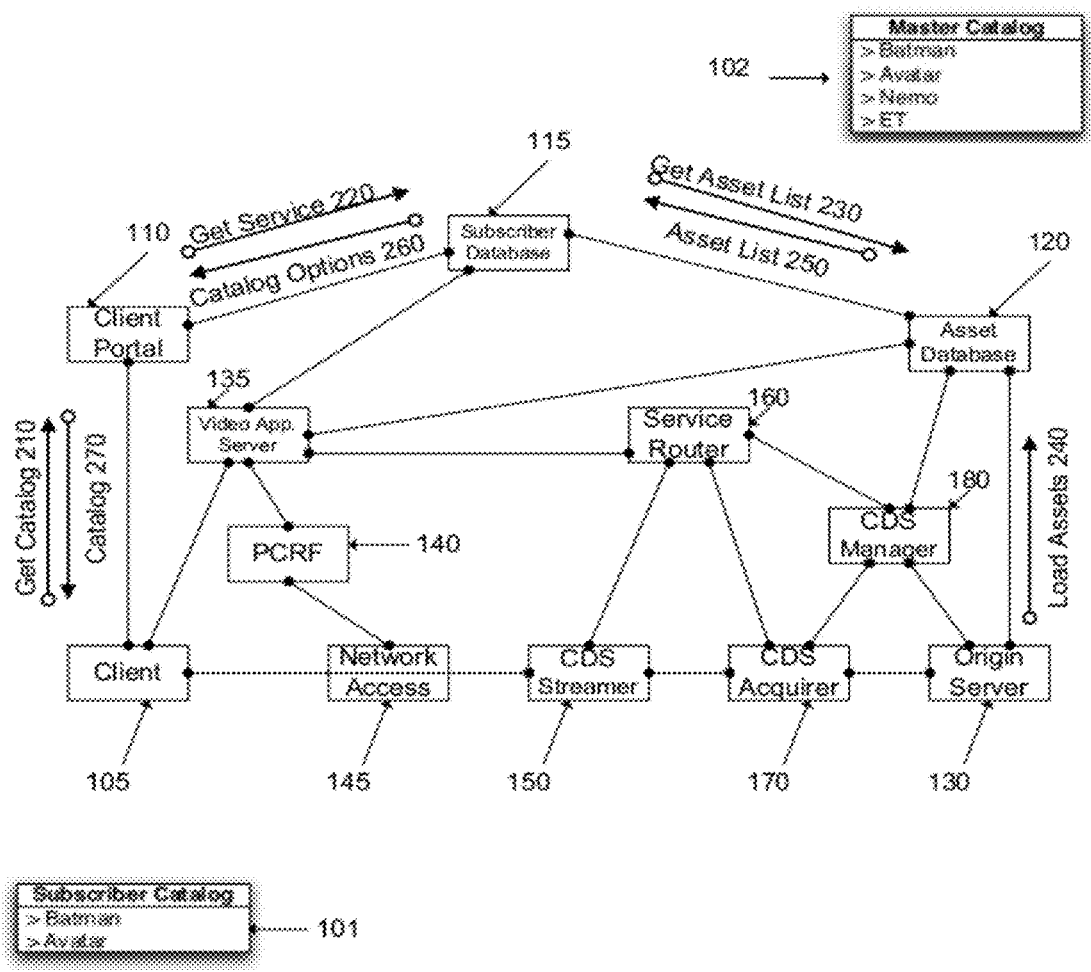
FIG. 1 is a block diagram illustrating an example environment in which certain embodiments of the present invention may be implemented.

In various embodiments, a method may be provided to provide per-subscriber stream management comprising: receiving a playlist referencing a sequence of stream segments associated with an asset, wherein the playlist references a set of playlists that reference different bit rates, and wherein the sequence of stream segments is a subset of the entirety of segments associated with the asset; selecting one of the playlists in the set; downloading at least one of the sequence of stream segments in the selected playlist; establishing a state associated with a subscriber requesting the asset, wherein the state is different than the state for a second subscriber requesting the same asset; determining whether the rate of delivery is too high or too low based on network conditions and the subscriber state; and requesting a different one of the playlists referencing a different bit rate than the previously selected playlist.

Consistent with embodiments of the present invention, a method may be provided to provide per-subscriber stream management comprising: providing a catalog of video assets to one of a plurality of requesting subscribers; receiving a selection of a first video asset; creating a state unique to the requesting subscriber; requesting one or more playlists associated with the video stream; creating a data structure list representing the available stream sequences for each bit rate available to the subscriber; and providing the subscriber with a dynamically built playlist containing a subset of the entirety of segments associated with the video asset at subscriber-eligible bit rates.

Consistent with embodiments of the present invention, a system may be provided to provide per-subscriber stream management comprising: a client capable of receiving a playlist containing a subset of segments associated with a video asset; a video application server to request subscriber state information and to build state representations in a subscriber database on a per-subscriber basis; a media segmenter capable of providing the video asset in multiple bit rates; a subscriber state manager capable of managing the current state of one or more subscribers in a subscriber database; and a stream manager capable of requesting the assignment of bandwidth from a wireless infrastructure on a per-subscriber basis.

Embodiments of the present invention may leverage the generic distributed content distribution model using HTTP delivery while retaining control of the subscriber's streaming session. Benefits to this approach include the ability to perform per-subscriber ad-insertion, per-subscriber quality of service management, and per-subscriber accounting. In some embodiments, the content creation and packaging may be conducted by a third party while the service provider conducts the content packaging.

The opportunity for the service provider to perform the content packaging may allow monetization through ad-insertion and performing local content insertion. For example, pegs and/or barkers may be locally inserted. Also, the content provider's ability to conduct per-subscriber state management may allow the provider the opportunity to provision, assign, monitor, and reclaim capacity for an improved quality of viewing experience.

The HTTP average bitrate ("ABR") methods as applied in industry, may require a stream encoding server to produce a sequence of MPEG2TS files that represent the video asset to be presented to the subscriber. The video asset may be encoded in multiple bit rates such that a variety of viewing devices may be used while traversing network environments with diverse bandwidth delivery characteristics. The encoding server may create a playlist file formatted as an M3U8 file. This file may directly reference the sequence of stream segments.

Alternatively, the playlist file may reference a set of playlists that reference different bit rates. Embodiments of the present invention may have the client download the playlist and subsequently download each stream segment in the playlist. The client may then determine that the rate of data delivery for a specific stream is too low or too high, in which case the client may call for a different bit rate of the stream using a different variant of the playlist.

One problem with the above-described approach may be that the client may be provided the playlist that describes the entire stream sequence for a video-on-demand and immediately begin downloading the segments as fast as it can. In fact, the client could collect all the segments simultaneously using a widely distributed peer-to-peer content distribution network. The impact may be a flash demand for content download. In a bandwidth constrained infrastructure such as a 2G/3G wireless access network, such an event may be disastrous and lead to a denial of service.

As such, embodiments of the present invention may provide the subscriber with a subset of the stream segments such that the client may be forced to regulate the segment requests. Such an approach may be naturally induced for a HTTP Live Streaming method where the next segments may be automatically concatenated to the end of the playlist. Assuming the client has caught up, the client request for the next index file will only review the next available set of segments. The HTTP Live Streaming method may also delete expired streaming segments from the playlist using a first-in, first-out method. This may allow the maintenance of a sliding window to mitigate the client's ability to "start over" and perform a rapid catch up function.

This is not the case for a classic video on demand set up where the entire stream sequence must be persistently available and defined by the playlist. This may be accomplished only by creating a state for a per-subscriber playlist with a finite set of segments that the service provider deems is reasonable for the client to collect, buffer, and render. The operator may allow the client access to some historical segments in the playlist to facilitate rewind or the client may allow a finite set of segments in the future to allow some fast-forward capabilities while minimizing the opportunity for the client to download the entire sequence of streams. The window of available segment may be configurable. In the case of HTTP Live Streaming, the window can only be configurable for the past segments as the new window segments have not yet been created. However, embodiments of the present invention may leverage the windowing concept when applied to on-demand streams as well.

The stream management function of embodiments of the present invention, may require a subscriber to login and view a catalog of video assets. The subscriber may then select a video and create a state on a per-subscriber session. The stream manager may then query the origin server for the playlist associated with the stream(s) and create a data structure list representing the sequence of stream segments for each bit-rate. The client may then perform a standard HTTP GET call to the stream manager. The GET call may result in the dynamic building of a playlist file in the appropriate M3U8 format.

The dynamically created playlist may have a short sequence of stream segments (e.g. 30 seconds duration) at the subscriber eligible bit rates with a defined specified expiration time. The client may then interpret the playlist and begin to download the segments specified in the playlist. This may be accomplished through standard HTTP GET calls to the content distribution system. It should be noted that the acquisition of the playlist (i.e., the control plane) may be a separate call from the acquisition of the content (i.e., the data plane).

As the client buffers the video stream, it begins decoding and rendering the video to the player. In the meantime, the client may recognize that the segments prescribed in the playlist is about to be exhausted and may subsequently query the stream manager for the playlist of the asset. The stream manager may then dynamically build a new playlist based on the known state of the client (the last sequence referenced). The stream manager may present the client with the next set of segments in the sequence. As a result, the client may continue to download the stream segments filling the buffer for linear rendering.

Since each subscriber may be assigned with a unique state in the stream manager each client may have a different reference point into the same media files stored on the content distribution system. The media delivered can be video-on-demand where each subscriber may be given a unique instance of the playlist. Alternatively, live delivery may be provided when all subscribers are presented with the same instance of a live playlist. In either case, the content may have a finite lifetime as defined by the per-subscriber state in the stream manager.

One advantage of embodiments of the present invention is the ability to monitor the state of the subscriber's session. The state manager may allow the content provider to perform a number of functions, including the managing quality of service on a per-subscriber basis. Furthermore, the content provider may be allowed to perform accounting on a per-subscriber basis, and perform local ad insertion functions.

The stream manager may be cognizant of the available stream bit rates for a given asset based on the asset's playlist variants for each encoding. The media segmenter may produce the asset in multiple bit rates according to the operator or content provider's specifications. The availability of the stream variants associated with the asset may be regulated in embodiments of the present invention. The default case when considering HTTP ABR may be that the playlist itself may contain all of the relevant stream variants. For on-demand, the playlist may contain all of the variants with all segments from beginning to end.

In embodiments of the present invention, the principle function of the stream manager may be to provide some boundaries on the availability of the content such that the delivery process may be optimized to the client according to policy, available bandwidth, usage limits, and client state. It should be understood that there may be several options available for quality of service management.

Again, in a default case, the client may select the highest bit-rate stream and attempt to fill the buffer. The client may detect the depletion of the video buffer and adapt to a lower stream rate according to the network's ability to deliver content in a consistent manner. In the case of a wireless infrastructure, the available bandwidth may vary over time according to RF interference, allocation of the default bearer to more clients, and distance attributed to mobility. In this case, embodiments of the present invention may use the stream manager to regulate the rates available to the client and the assigned capacity in the wireless infrastructure.

The client may select a high bit-rate stream in which the stream manager can make a call to a policy control and rules function ("PCRF"). An example is the ability of the stream manger to request the assignment of bandwidth from the wireless infrastructure for the highest bit-rate available in the asset. The PRCF may grant the request, deny the request, or provide a best option response. The stream manager can use the result to facilitate optimized streaming to the client at the requested bit-rate. The stream manager may eliminate stream rates of the asset that the network is unable to deliver.

The dynamically created playlist for this subscriber may include only a subset of the available stream rates. The subset still allows the client to adapt to localized conditions (i.e. lower its bit rate due to CPU issues or increase its bit rate to maximize quality.) Alternatively, the stream manager may reject the client's request. However, this may be considered unacceptable since the subscriber has presumably paid for a service. However, there may be cases where the PCRF is unable to deliver any of the bit-rates available in which case it is better to deny service to a subscriber than to induce a congested network to the point of creating a denial of service for all subscribers.

Furthermore, the stream manager may downgrade the clients request by restricting access to specific playlist variants (e.g. only playlists with stream rates below 512 kbps are available). This case may conform to a best-effort model (i.e. undefined bit-rate is available) or a best-match model (i.e. 512 kbps of capacity will be assigned to the subscriber). The stream manager may reserve the bandwidth through the PCRF. Since the stream manager knows the duration of the client's last playlist request, the stream manager can expire the subscriber's session. In doing so, the current state of the playlist can be saved or archived. In addition, expired sessions may invoke the stream manager to delete the bandwidth assigned by the PCRF or sustain the bandwidth in anticipation of the client initiating a resume function.

The threshold for expiration, archiving, and decommissioning of resources can all be configured on a per-subscriber bases in the state manager function. Finally, the playlist delivered to the client may include the URL of the specific segments available for streaming. The stream manager may append attributes to the URL that serve as bandwidth hints. The URL for the 512 kbps might have the +512 kbps tag appended while the URL for the 256 kbps segments might have the +256 kbps tag appended. The client may now make a request for the segments from the stream server. A specialized stream server in a CDN can interpret the bandwidth requirement from a client request by noting the bit-rate appended to the URL.

In doing so, the stream server may throttle the deliver delivery rate of the stream in accordance with the bit-rate assigned by the PCRF. This may allow the stream server to trickle the content at the appropriate rate to the client such that the queue depths in the wireless infrastructure are not flooded with oversized HTTP downloads. Instead of the attempting to download a 10 second segment of 1 MB instantaneously, the stream server can deliver the 1 MB segment over an extended period of time such as 2× the bit rate to insure the content is delivered well in advance of the client's buffer being exhausted, but still allowing the RF network the ability to handle the stream without overflowing the queues.

The archival functions in the stream manager may serve as a pseudo 'bookmark' for resume playing features. A client that has been disconnected may be presented with the asset list and a resume option. The resume option allows the stream manager to dynamically build a new per-subscriber playlist based on the subscriber's last playlist download. The asset may have a time reference marker associated with each segment.

The time marker may be used to correlate resume functions when using other linear streaming methods such as RTSP's use of the NPT attribute.

The per-subscriber stream manager may also induce the client to download playlists of ad-inserts, peg/barker messages, or local streams. The stream manager can dynamically build the playlist with mid-stream inserts and associated callbacks to resume play of the primary asset. The stream manager can also perform the accounting functions based on the playlist requests. The playlist for the primary asset can be used to determine roughly how much data has been delivered, the ad-streams presented, and confirmation of peg/barker announcements.

From an accounting perspective, the stream manager may be used to insert operator messages to notify the subscriber of threshold limits that are occasionally used on wireless access services. Threshold limits might include service expiration times or data delivery limits. These operator defined playlists may be used to redirect the client to an accounting function (e.g. credit card billing) to extend the time threshold or increase the data delivery limits. The relationships between the client, the origin server, and the distribution servers are controlled by the stream manager. Although the stream manager serves as an intermediary between the client and the origin/content distribution servers with respect to the control plane, the traditional content distribution functions such as HTTP can still be used for data plane distribution between the client and the content server.

The content distribution system may simply serve as a caching HTTP server on behalf of the origin server. Essentially, the stream manager briefly relinquishes control of the stream download between the client and the content distribution system while forcing the client to 'periodically check in' to maintain the download. The rate that the client is required to 'check in' is a function of stream manager's policy. The stream manager may specify that the client can download the stream based on an increment of the smallest atomic unit (i.e. a single segment) up to the complete stream where the end-of-stream marker is read. The latter case might be used for short clips (e.g. 3 to 5 minutes) where state management is less relevant while the former case would be used for assets such as full length feature films.

Embodiments of the present invention for stream management may be implemented in hardware, software, firmware, or a combination thereof (collectively or individually also referred to herein as logic). To the extent certain embodiments, or portions thereof, are implemented in software or firmware, executable instructions or code for performing one or more tasks of per-subscriber stream management are stored in memory or any other suitable computer readable medium and executed by a suitable instruction execution system. In the context of this document, a computer readable medium is an electronic, magnetic, optical, or other physical device or means that can contain or store a computer program for use by or in connection with a computer related system or method.

To the extent embodiments, or portions thereof, are implemented in hardware, the present invention may be implemented with any or a combination of the following technologies: a discrete logic circuit(s) having logic gates for implementing logic functions upon data signals, an application specific integrated circuit (ASIC) having appropriate combinational logic gates, programmable hardware such as a programmable gate array(s) (PGA), a field programmable gate array (FPGA), etc.

FIG. 1 is a block diagram illustrating a network environment in which certain embodiments of per-subscriber stream management may be implemented. Network environment may comprise, for example, a client 105. Client 105 may authenticate with a client portal 110. Client 105 may include a request to see the playlist 210. Client portal 110 may query a subscriber database 115 with a get service request 220 to determine the assets the subscriber is permitted to view. In some embodiments of the present invention, the request may be based on a service package associated with client 105. A service package may consist of a plurality of assets.

Subscriber database 115 may then send a get asset list request 230 to an asset database 120. Asset database 120 may load assets 240 from an origin server 130. Asset database may subsequently provide the list of assets to subscriber database 115 through message 250. The list of assets includes a plurality of assets associated with the service package. Subscriber database 115 may add catalog options to the asset list and provide an enhanced catalog message 260 to client portal 110. Client portal 110 subsequently may provide a catalog message 270 to client 105. Catalog message 270 provides client 105 with a list of viewable assets associated with their service package.

Figure 2:
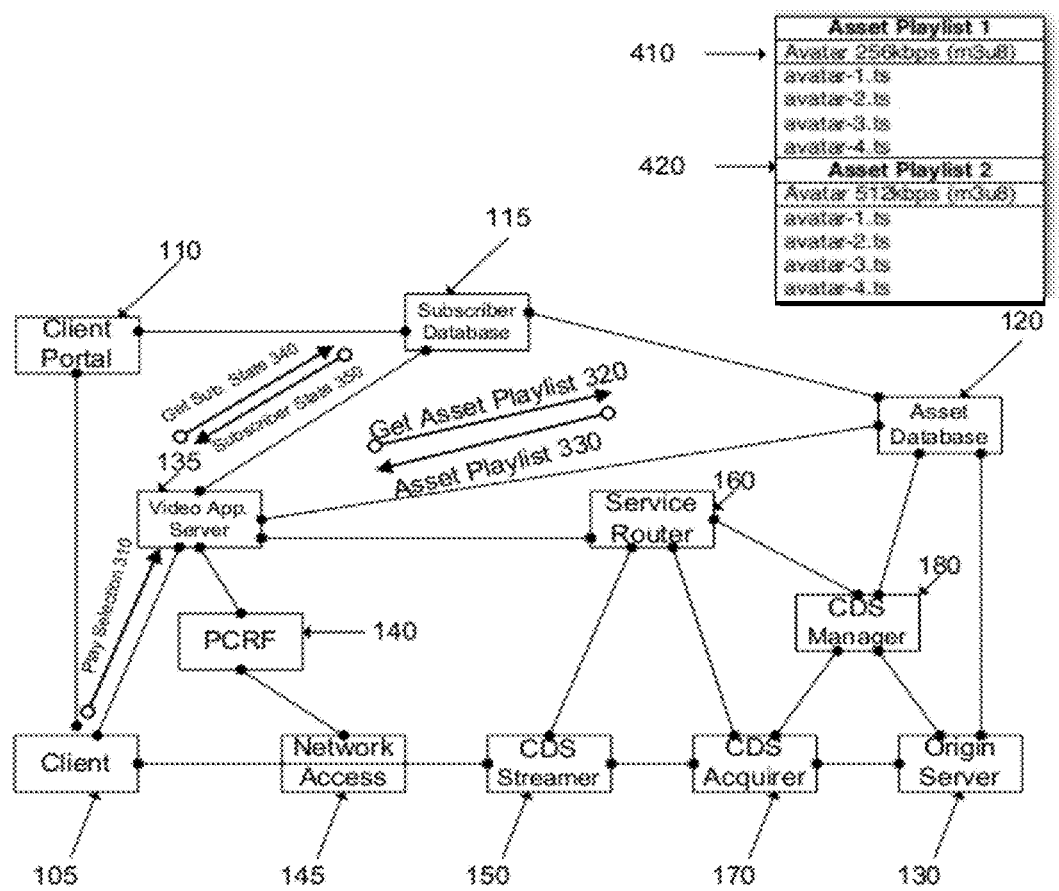
FIG. 2 is a block diagram illustrating an example environment in which certain embodiments of the present invention may be implemented.

Turning to FIG. 2, client 105 may now request to play a selection from the received catalog. This may be accomplished through a play selection message 310 sent to a video application server 135. Video application server 135 may build a state representation of the subscriber's activity. Video application server 135 may send a get asset playlist message 320 to asset database 120 to obtain a list of stream options. Asset database 120 may return an asset playlist message 330 to video application server 135. Asset playlist message 320 may comprise a playlist in m3u8 format which contains all of the stream options for the selected asset.

Video application server 135 may parse the playlist and build a list structure for the subscriber. The list structure may indicate the offset into the featured asset that the subscriber is currently viewing. If the asset has been previously viewed, video application server 135 may send a get subscriber state message 340 to subscriber database 115. In response, subscriber database 115 provides a subscriber state message 350 which may contain the last segment delivered to client 105.

Figure 3:
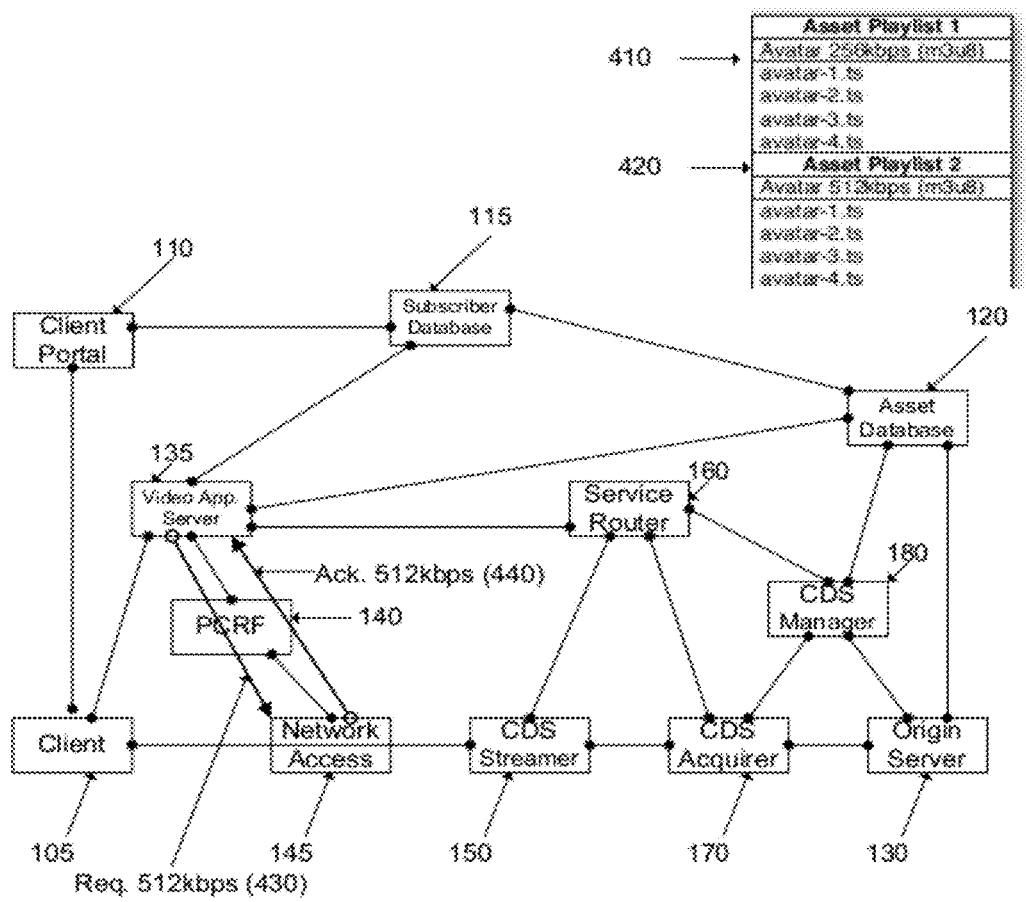
FIG. 3 is a block diagram illustrating an example environment in which certain embodiments of the present invention may be implemented.

Turning to FIG. 3, video application server 135 may now see that multiple instances of the asset exist, such as asset playlist 410 and asset playlist 420, which are different instances of the "Avatar" asset. Video application server 135 may then make a capacity request 430 to PCRF 140 through network access 145 at the highest bandwidth available (i.e., 512 kbps). PCRF 140 may subsequently respond with either an acknowledgement message 440 or a rejection message (not shown). At this point, PCRF 140 may accept the bandwidth request, which may lead to video application server 135 to include the highest bandwidth asset.

Figure 4:
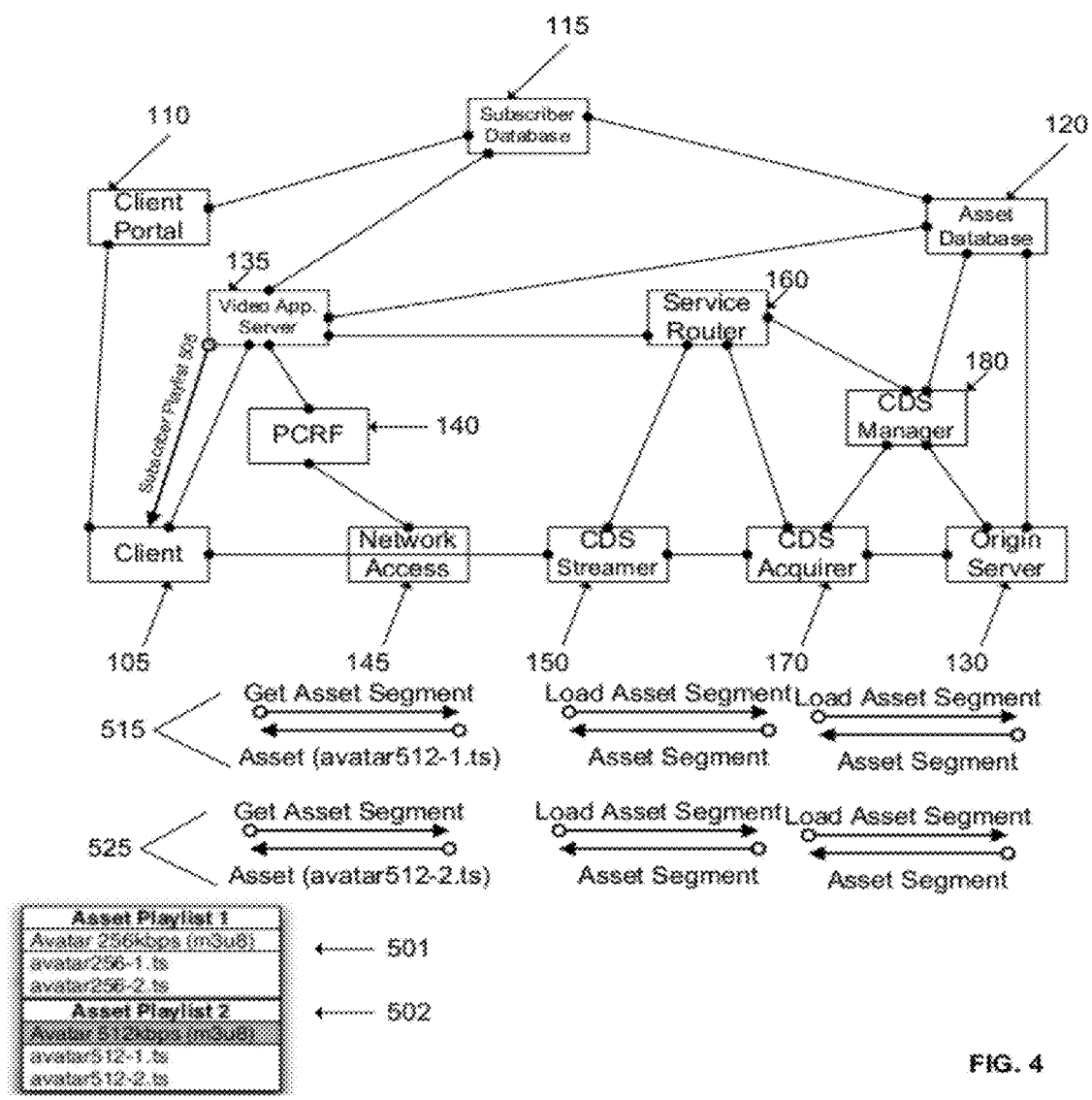
FIG. 4 is a block diagram illustrating an example environment in which certain embodiments of the present invention may be implemented.

FIG. 4 illustrates that video application server 135 may provide the subscriber playlist message 505 to client 105. Playlist message 505 may comprise various bandwidth options for client 105 such as asset playlist 501 and asset playlist 502. It should be understood that video application server 135 may have only delivered a partial sequence of segments associated with the asset. The number of segments may be configurable based on the lead time that video application server 135 wants client 105 to have available for fast-forward purposes. Client 105 may now request each segment of the asset sequentially from the streamer/cache. For example, client 105 may request and receive asset (avatar512-1.ts) through a series 515 of requests travelling between client 105 and origin server 130. Likewise, client 105 may request and receive asset (avatar512-2.ts) through a series 525 of requests travelling between client 105 and origin server 130. Client 105 may have the option of requesting a lower bit-rate version if the rendering capabilities of the device are incapable of playing the higher bit-rate version.

Figure 5:
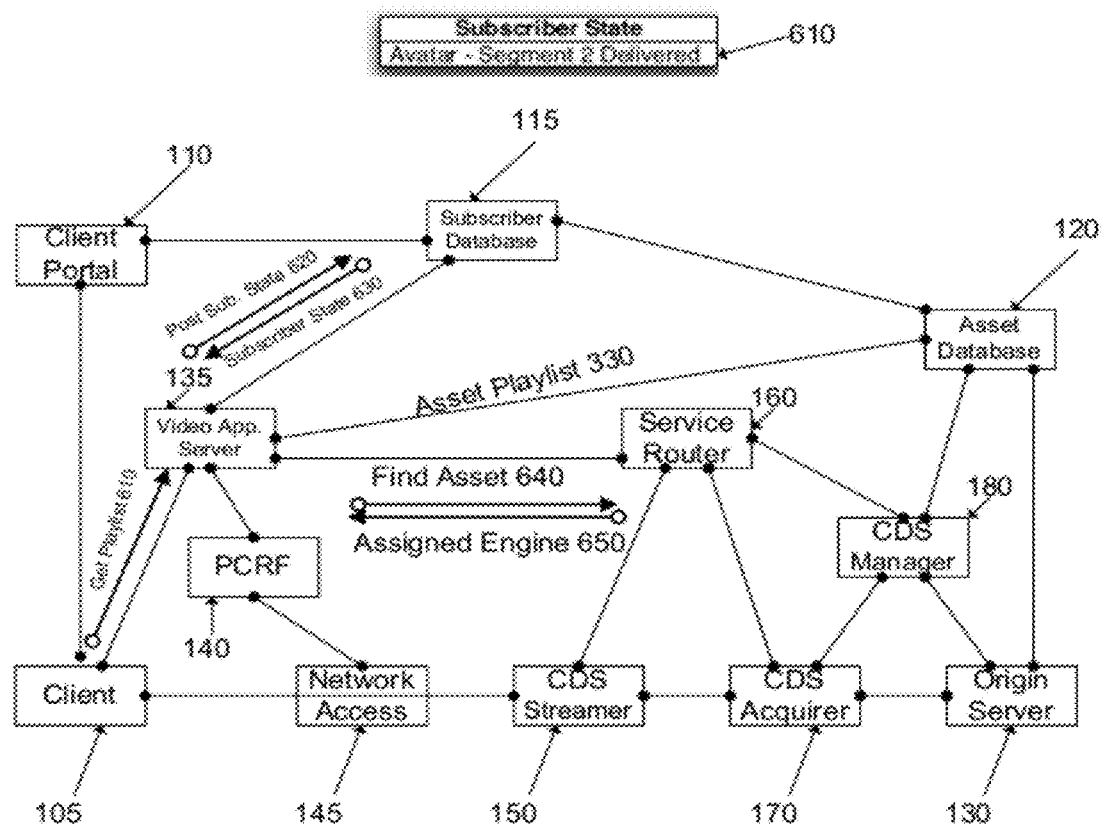
FIG. 5 is a block diagram illustrating an example environment in which certain embodiments of the present invention may be implemented.

In FIG. 5, client 105 may realize that its buffer has been depleted for the purpose of rendering and may make a playlist update request 610 to video application server 135 before it reached the End of Stream. Playlist update request 610 may be issued to video application server 135 which recognizes that client 105 has already requested the previous segments. Video application server 135 may now send a post client state message 620 to subscriber database 115. This will result in the posting of client's 105 state to subscriber database 115. Subscriber database 115 may create a representative bookmark 590 for how much of the asset client 105 has rendered.

Subsequently, subscriber database 115 may respond with a message 630 indicating successful update of the current state 590 of the subscriber. Video application server 135 may then send an update request to a service router 160. Service router 160 may send a response message 650 which may indicate the location of any of the requested asset segments. Response message 650 may also indicate the URI (URL?) indicating the most appropriate streamer/cache for client 105 to request the segments.

Figure 6:
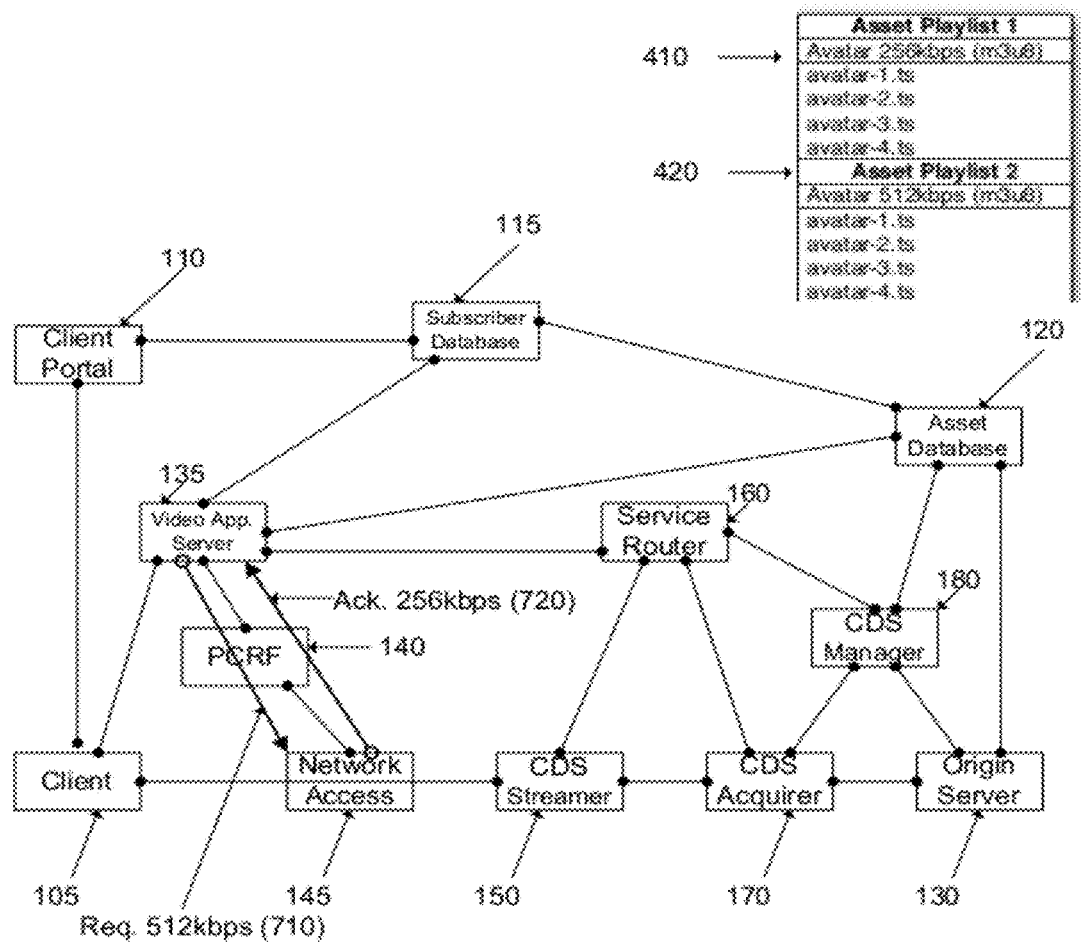
FIG. 6 is a block diagram illustrating an example environment in which certain embodiments of the present invention may be implemented.

Turning to FIG. 6, video application server 135 may now refresh the requirement for the highest bit-rate asset available from PCRF 140. Alternatively, PCRF 140 may have asynchronously downgraded the available bit-rate. Video application server 135 may now know that only a subset of the streams identified in the playlist 410 may be reliably delivered. As such, the video application server 135 may make a capacity request 710 to PCRF 140 through network access 145 at the highest bandwidth available (i.e., 512 kbps). PCRF 140 may subsequently respond with an acknowledgement message 720 indicated that the lower bit-rate asset is being provided.

Figure 7:
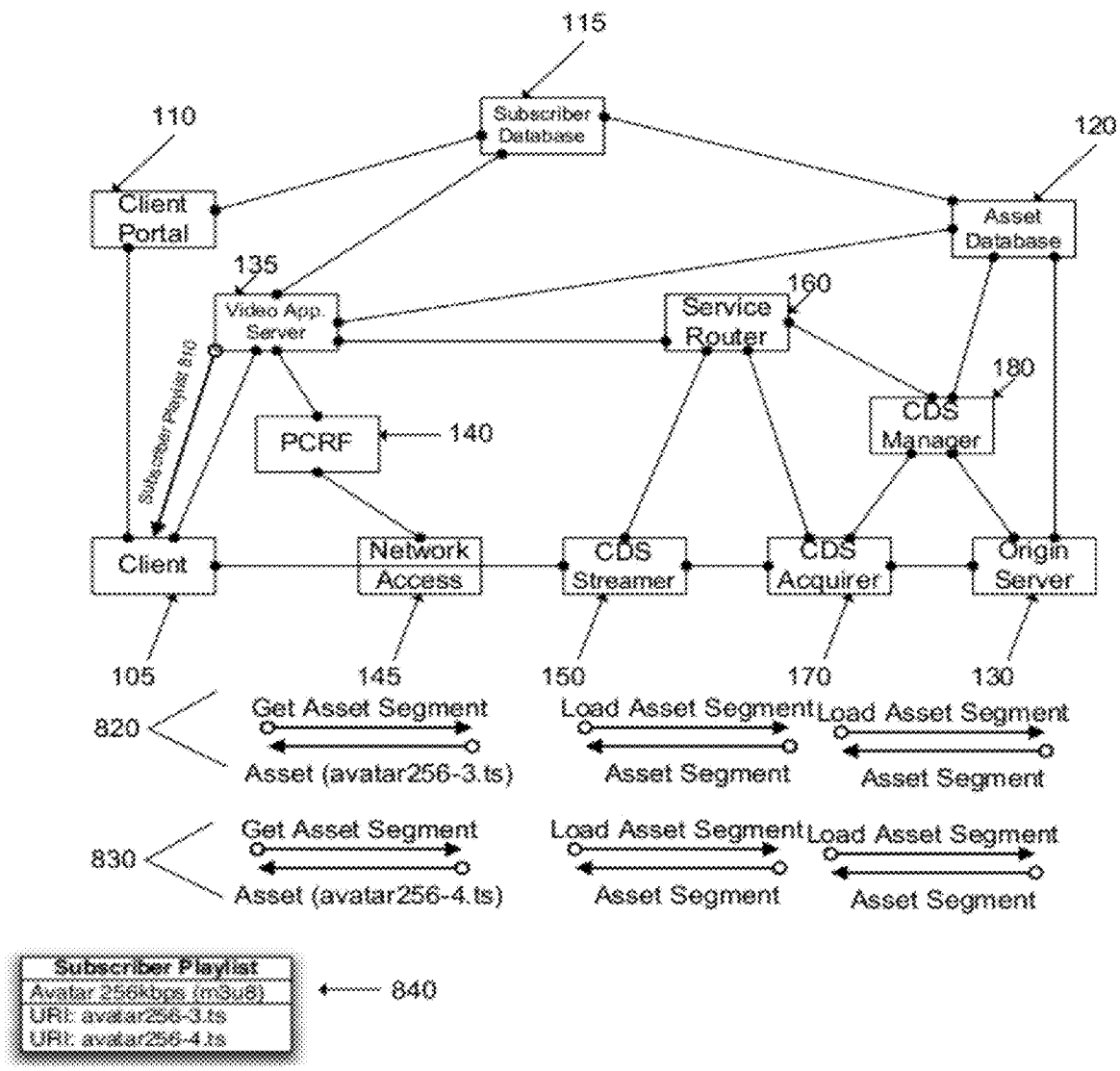
FIG. 7 is a block diagram illustrating an example environment in which certain embodiments of the present invention may be implemented.

Continuing in FIG. 7, video application server 135 may provide client 105 with a subscriber playlist message 810 containing subscriber playlist 840. Subscriber playlist 840 may only offer the lower bit-rate stream to client 105. Again, substitute playlist 840 may be truncated such that client 105 may only render a designated amount of the asset before being forced to refresh its playlist. Client 105 may now request each segment of the asset sequentially to re-fill the video rendering buffer. For example, client 105 may request and receive asset (avatar256-3.ts) through a series 820 of requests travelling between client 105 and origin server 130. Likewise, client 105 may request and receive asset (avatar256-4.ts) through a series 830 of requests travelling between client 105 and origin server 130.

Figure 8:
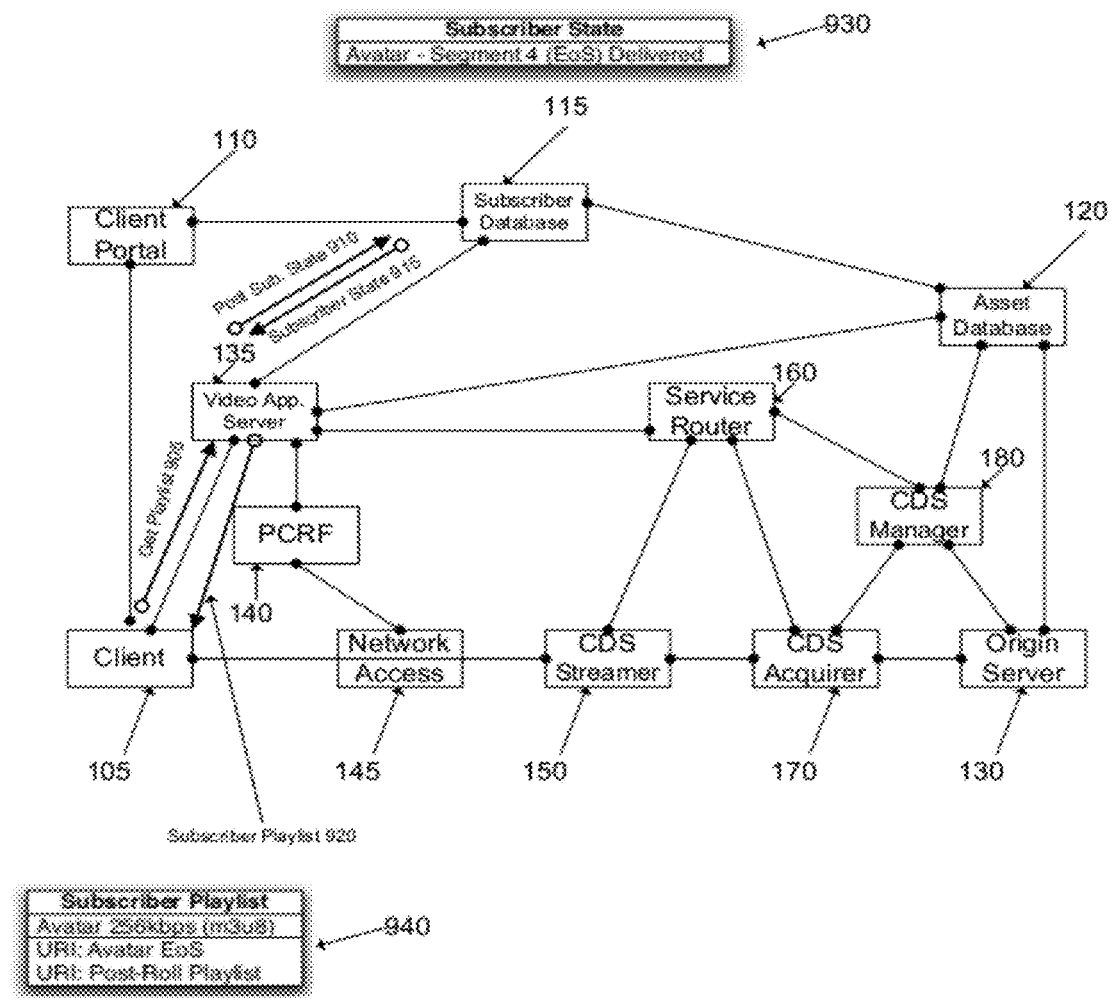
FIG. 8 is a block diagram illustrating an example environment in which certain embodiments of the present invention may be implemented.

As client 105 has not reached the end of stream marker in the playlist, client 105 may continue to request the updated playlist 940 as illustrated in FIG. 8. Client 105 sends a request playlist message 905 to video application server 135. Video application server 135 sends a post subscriber state message 910 to subscriber database 115. The posted subscriber state 930 indicates that client 105 has reached the end of stream marker. This posted subscriber state 930 is delivered via message 915 to video application server 135. Subsequently, video application server 135 may deliver playlist 940 to client 105 in playlist message 920. Playlist 940 may indicate that the subscriber has now reached end of the stream. Playlist 940 may now include an end of stream indication. Playlist 940 may now further include ant post-roll playlist such as advertisements or trailers.

Figure 9:
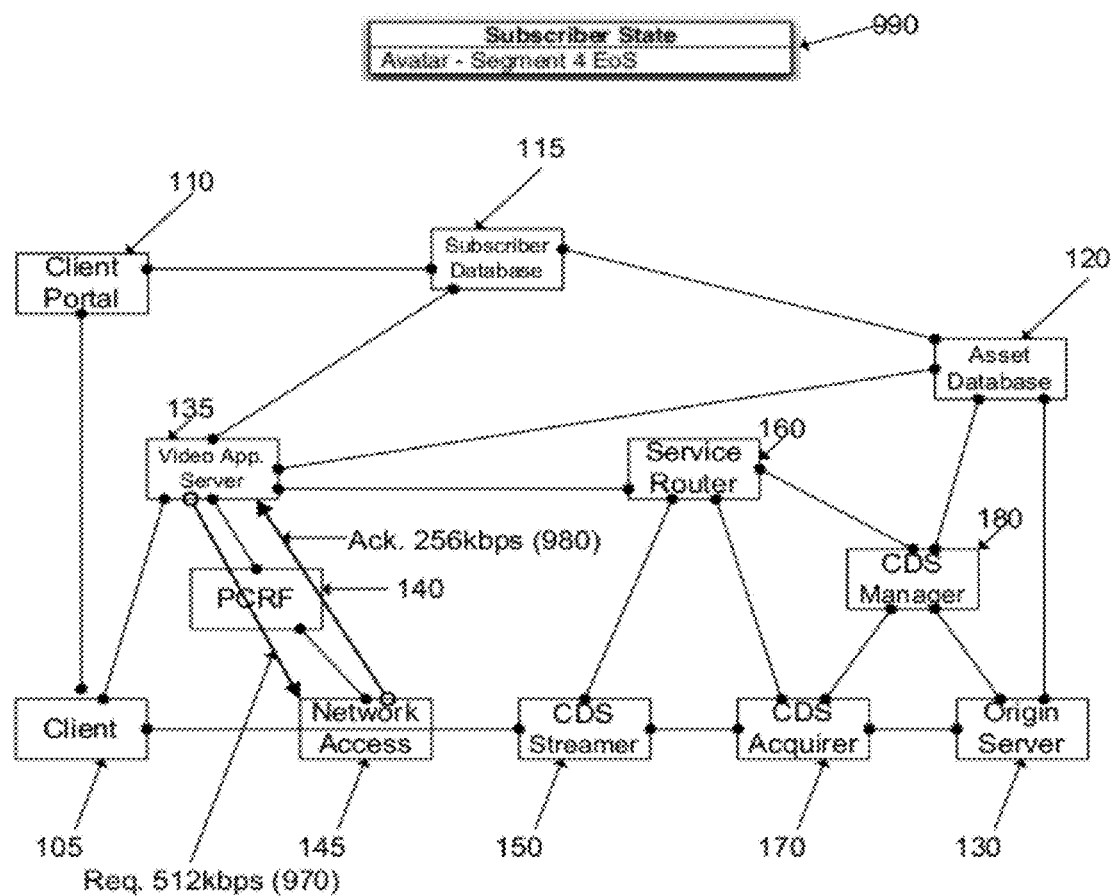
FIG. 9 is a block diagram illustrating an example environment in which certain embodiments of the present invention may be implemented.

Finally, turning to FIG. 9, video application server 135 may indicate to PCRF 140 through message 1010 that the allocated resources may now be released since the client stream has completed. The video bearer channel may then be released by PCRF 140. PCRF 140 may subsequently notify video application server 135 through acknowledgement message 1020 that notifies that the state has been removed for client 105.

Figure 10:
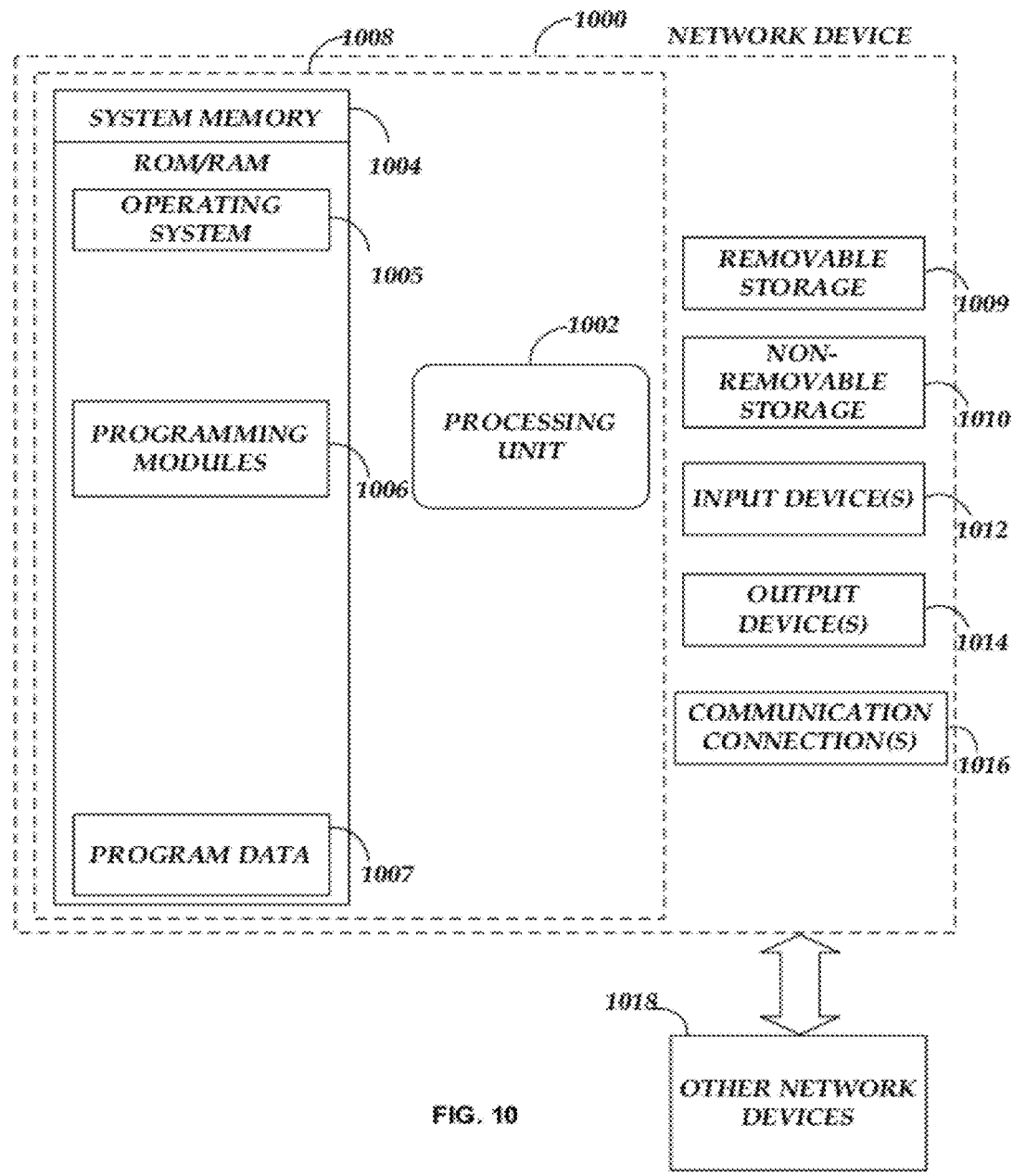
FIG. 10 is a block diagram of a system including a network device.

FIG. 10 is a block diagram of a system including network device 1000. Consistent with embodiments of per-subscriber stream management, the aforementioned memory storage and processing unit may be implemented in a network device, such as network device 1000 of FIG. 10. Any suitable combination of hardware, software, or firmware may be used to implement the memory storage and processing unit. For example, the memory storage and processing unit may be implemented with network device 1000 or any of other network devices 1018, in combination with network device 1000. The aforementioned system, device, and processors are examples and other systems, devices, and processors may comprise the aforementioned memory storage and processing unit, consistent with embodiments of per-subscriber stream management. Furthermore, network device 1000 may comprise an operating environment for system 100 as described above. System 100 may operate in other environments and is not limited to network device 1000.

With reference to FIG. 10, a system consistent with embodiments of the present invention of per-subscriber stream management may include a network device, such as network device 1000. In a basic configuration, network device 1000 may include at least one processing unit 1002, a secure processing unit for decryption 1020, and a system memory 1004. Depending on the configuration and type of network device, system memory 1004 may comprise, but is not limited to, volatile (e.g., random access memory (RAM)), non-volatile (e.g., read-only memory (ROM)), flash memory, or any combination. System memory 1004 may include operating system 1005, one or more programming modules 1006, and may include program data 1007. Operating system 1005, for example, may be suitable for controlling network device 1000's operation. Furthermore, embodiments of per-subscriber stream management may be practiced in conjunction with a graphics library, other operating systems, or any other application program and is not limited to any particular application or system. This basic configuration is illustrated in FIG. 10 by those components within a dashed line 1008.

Network device 1000 may have additional features or functionality. For example, network device 1000 may also include additional data storage devices (removable and/or non-removable) such as, for example, magnetic disks, optical disks, or tape. Such additional storage is illustrated in FIG. 10 by a removable storage 1009 and a non-removable storage 1010. Computer storage media may include volatile and nonvolatile, removable and non-removable media implemented in any method or technology for storage of information, such as computer readable instructions, data structures, program modules, or other data. System memory 1004, removable storage 1009, and non-removable storage 1010 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by network device 1000. Any such computer storage media may be part of device 1000. Network device 1000 may also have input device(s) 1012 such as a keyboard, a mouse, a pen, a sound input device, a touch input device, etc. Output device(s) 1014 such as a display, speakers, a printer, etc. may also be included. The aforementioned devices are examples and others may be used.

Network device 1000 may also contain a communication connection 1016 that may allow device 1000 to communicate with other network devices 1018, such as over a network in a distributed network environment, for example, an intranet or the Internet. Communication connection 1016 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1004, including operating system 1005. While executing on processing unit 1002 or secure processing unit for decryption 1020, programming modules 1006 may perform processes including, for example, one or more method 500's stages as described above. The aforementioned process is an example; processing unit 1002 and secure processing unit for decryption 1020 may perform other processes.

Generally, consistent with per-subscriber stream management according to embodiments of this invention, program modules may include routines, programs, components, data structures, and other types of structures that may perform particular tasks or that may implement particular abstract data types. Moreover, embodiments may be practiced with other computer system configurations, including hand-held devices, multiprocessor systems, microprocessor-based or programmable consumer electronics, minicomputers, mainframe computers, and the like. Embodiments of per-subscriber stream management may also be practiced in distributed network environments where tasks are performed by remote processing devices that are linked through a communications network. In a distributed network environment, program modules may be located in both local and remote memory storage devices.

Furthermore, embodiments of per-subscriber stream management may be practiced in an electrical circuit comprising discrete electronic elements, packaged or integrated electronic chips containing logic gates, a circuit utilizing a microprocessor, or on a single chip containing electronic elements or microprocessors. Embodiments may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of per-subscriber stream management, for example, may be implemented as a computer process (method), a network system, or as an article of manufacture, such as a computer program product or computer readable media. The computer program product may be a computer storage media readable by a computer system and encoding a computer program of instructions for executing a computer process. The computer program product may also be a propagated signal on a carrier readable by a network system and encoding a computer program of instructions for executing a computer process. Accordingly, aspects of per-subscriber stream management may be embodied in hardware and/or in software (including firmware, resident software, micro-code, etc.). In other words, embodiments of per-subscriber stream management control may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of per-subscriber stream management, for example, are described above with reference to block diagrams and/or operational illustrations of methods, systems, and computer program products according to embodiments of per-subscriber stream management. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of per-subscriber stream management have been described, other embodiments may exist. Furthermore, although embodiments have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of per-subscriber stream management.

At least the following is claimed:

1. A method comprising:
   receiving a playlist referencing a sequence of stream segments associated with an asset, wherein the playlist references a set of playlists that reference different bit rates, and wherein the sequence of stream segments is a subset of the entirety of segments associated with the asset;
   selecting one of the playlists in the set;
   downloading at least one of the sequence of stream segments in the selected playlist;
   establishing a unique state associated with a subscriber requesting the asset, wherein the state is different than the state for a second subscriber requesting the same asset;
   determining whether the rate of delivery is too high or too low based on network conditions and the subscriber state;
   requesting a different one of the playlists referencing a different bit rate than the previously selected playlist based on the rate delivery determination
   receiving an updated state specific to the subscriber; and
   providing the subscriber with a dynamically updated playlist containing a subset of the entirety of the sequence of stream segments based on the received state.

2. The method of claim 1, wherein the different one of the playlists is selected based on the bandwidth currently available to the subscriber.

3. The method of claim 2, wherein the different one of the playlists contains a configurable number of segments.

4. The method of claim 1, further comprising:
   making a capacity request at the highest bandwidth available; and receiving acknowledgement that the asset will be provided at a lower bit-rate.

5. The method of claim 1, wherein the playlists are provided in m3u8 format.

6. The method of claim 1, further comprising:
   determining if the end of stream marker in the playlist has been reached; and if the end of stream marker in the playlist has not been reached, requesting an updated playlist.

7. The method of claim 1, further comprising:
   determining if the end of stream marker in the playlist has been reached; and if the end of stream marker in the playlist has been reached, releasing resources allocated for the rendering of the asset.

8. A method comprising:
   providing a catalog of video assets to one of a plurality of requesting subscribers;
   receiving a selection of a first video asset; creating a state unique to the requesting subscriber;
   requesting one or more playlists associated with the video stream;
   creating a data structure list representing the available stream sequences for each bit rate available to the subscriber;
   providing the subscriber with a dynamically built playlist containing a subset of the entirety of segments associated with the video asset at subscriber-eligible bit rates;
   receiving an updated state specific to the requesting subscriber; and
   providing the subscriber with a dynamically updated playlist containing a subset of the entirety of segments based on the state specific to the requesting subscriber.

9. The method of claim 8, wherein the updated state comprises the last sequence referenced by the subscriber.

10. The method of claim 8, further comprising inserting advertising material into the dynamically updated playlist.

11. The method of claim 8, further comprising inserting operator messages into the dynamically updated playlist, wherein the operator messages notify the subscriber of threshold limits.

12. The method of claim 8, wherein the step of providing the catalog based on a source package associated with the client.

13. The method of claim 8, further comprising:
parsing the dynamically updated playlist; and
building a list structure for the subscriber, wherein the list structure indicates the offset into the asset.

14. A system comprising:
a client capable of receiving a playlist containing a subset of segments associated with a video asset;
a video application server to:
request unique subscriber state information and to build state representations in a subscriber database on a per-subscriber basis;
receive an updated state specific to a first subscriber; and
provide the first subscriber with a dynamically updated playlist containing a subset of the entirety of the segments based on the received state;
a media segmenter capable of providing the video asset in multiple bit rates;
a subscriber state manager capable of managing the current state of one or more subscribers in a subscriber database; and
a stream manager capable of requesting the assignment of bandwidth from a wireless infrastructure on a per-subscriber basis.

15. The system of claim 14, wherein the stream manager optimizes the asset delivery based on policy, available bandwidth, usage limits, and the subscriber state.

16. The system of claim 14, further comprising a policy control and rules function to determine whether to grant, deny or provide a best option in response in response to assign requested bandwidth to the subscriber.

17. The system of claim 16, wherein the video application server is configured to make per-subscriber capacity requests to the policy control and rules function.

18. The system of claim 14, wherein the video application server is further configured to parse the playlist and build a list structure for the subscriber.

19. The system of claim 14, wherein the subscriber database is configured to create a bookmark for how much of the video asset has been rendered by the client.

* * * * *